(12) United States Patent
Kuttenkuler et al.

(10) Patent No.: US 10,086,703 B2
(45) Date of Patent: Oct. 2, 2018

(54) SYSTEM AND METHOD FOR CONTROLLING ELECTRICALLY DRIVEN ACCESSORIES

(71) Applicant: General Electric Company, Schenectady, NY (US)

(72) Inventors: Jason Daniel Kuttenkuler, Erie, PA (US); Henry Todd Young, Erie, PA (US); Aaron Mellinger, Erie, PA (US)

(73) Assignee: General Electric Company, Schenectady, NY (US)

( * ) Notice: Subject to any disclaimer, the term of this patent is extended or adjusted under 35 U.S.C. 154(b) by 280 days.

(21) Appl. No.: 14/972,739

(22) Filed: Dec. 17, 2015

(65) Prior Publication Data
US 2016/0185224 A1 Jun. 30, 2016

Related U.S. Application Data

(60) Provisional application No. 62/098,756, filed on Dec. 31, 2014.

(51) Int. Cl.
*B60L 1/00* (2006.01)
*B60L 11/18* (2006.01)
*H02P 27/06* (2006.01)

(52) U.S. Cl.
CPC ........... *B60L 1/003* (2013.01); *B60L 11/1803* (2013.01); *H02P 27/06* (2013.01); *Y02T 10/7258* (2013.01)

(58) Field of Classification Search
CPC ...................................................... B60L 1/003
(Continued)

(56) References Cited

U.S. PATENT DOCUMENTS 6,349,248 B1 2/2002 Dean et al.
8,260,487 B2 9/2012 Plawecki
(Continued)

FOREIGN PATENT DOCUMENTS

CN 101712303 A 5/2010
EP 1925493 A2 5/2008
(Continued)

OTHER PUBLICATIONS

Unofficial English Translation of Japanese Office Action issued in connection with corresponding JP Application No. 2015252722 dated Oct. 25, 2016.
(Continued)

*Primary Examiner* — Joseph Chang
(74) *Attorney, Agent, or Firm* — GE Global Patent Operation; John A. Kramer

(57) ABSTRACT

A vehicle includes a power source, a controller, a converter configured to receive a first voltage from the power source and to convert the first voltage to a second voltage, an auxiliary inverter system electrically coupled to an output of the converter and to an accessory having an electric motor, the auxiliary inverter system configured to convert the second voltage received from the converter for powering the electric motor, and a first communication link between the controller and the auxiliary inverter system. The auxiliary inverter system is further configured, responsive to interruption of the first communication link, to control a speed of the electric motor based on a level of the second voltage.

30 Claims, 2 Drawing Sheets

(58) Field of Classification Search
USPC .......................................................... 307/10.1
See application file for complete search history.

(56) References Cited

U.S. PATENT DOCUMENTS

| | | | |
|---|---|---|---|
| 9,024,551 B2 | 5/2015 | Mari Curbelo et al. | |
| 9,130,470 B2 | 9/2015 | Rosado et al. | |
| 9,270,189 B2 | 2/2016 | Rosado et al. | |
| 2008/0281479 A1 | 11/2008 | King et al. | |
| 2010/0013299 A1 | 1/2010 | Amler | |
| 2010/0236502 A1 | 9/2010 | Watanabe et al. | |
| 2011/0133549 A1* | 6/2011 | Song | B60L 3/003 307/10.1 |
| 2012/0146406 A1 | 6/2012 | Lin et al. | |
| 2014/0260410 A1* | 9/2014 | Chretien | H02P 27/08 62/426 |
| 2015/0306960 A1 | 10/2015 | Sobu et al. | |

FOREIGN PATENT DOCUMENTS

| | | |
|---|---|---|
| JP | 0698409 A | 4/1994 |
| JP | 2005304122 A | 10/2005 |
| JP | 2006197691 A | 7/2006 |
| JP | 2008131834 A | 6/2008 |
| JP | 2009012748 A | 1/2009 |
| JP | 2010527222 A | 8/2010 |
| JP | 2011004540 A | 1/2011 |
| JP | 2013015024 A | 1/2013 |
| JP | 2013051745 A | 3/2013 |
| JP | 2014091504 A | 5/2014 |
| JP | 2014131371 A | 7/2014 |
| RU | 2385237 C1 | 3/2010 |
| RU | 2470436 C1 | 12/2012 |

OTHER PUBLICATIONS

Unofficial English Translation of Japanese Search report issued in connection with corresponding JP Application No. 2015252722 dated Dec. 6, 2016.

Aranchiy G.V. et al, "Tiristornye Preobrazovateli Chastoty Dlya Reguliruemykh", Energiya, pp. 22-26, 1968, Moscow.

Unofficial English translation of Eurasian Search Report issued in connection with corresponding EA Application No. 201592257 dated Jun. 7, 2016.

* cited by examiner

SYSTEM AND METHOD FOR CONTROLLING ELECTRICALLY DRIVEN ACCESSORIES

CROSS-REFERENCE TO RELATED APPLICATIONS

This application claims the benefit of U.S. Provisional Application Ser. No. 62/098,756, filed on Dec. 31, 2014, which is herein incorporated by reference herein in its entirety.

BACKGROUND

Technical Field

Embodiments of the invention relate generally to controlling accessories. Other embodiments relate to a system and method for controlling electrically driven accessories.

Discussion of Art

In the mining industry, large off-highway vehicles, "OHVs", usually employ electrically motorized wheels for propelling or retarding the vehicle. In particular, OHVs typically include a large horsepower diesel engine in conjunction with an alternator, a main traction inverter, and a pair of wheel drive assemblies housed within the rear tires of the vehicle. The diesel engine drives the alternator, which powers the main traction inverter. The traction inverter includes semiconductor power switches that commutate the alternator output current to provide electrical power to electric drive motors, e.g., AC motors, of the wheel drive assemblies.

Similarly, trains typically feature a number of cars that are pushed or pulled by a locomotive that utilizes electric wheel motors to drive traction wheels. The electric wheel motors are powered via electrical distribution from one or more engine-driven generators housed within the locomotive.

In both OHV and rail applications, solid-state power converters are used to provide high voltage current from the generators or alternators to wheel drive motors. Such power converters include inductive coils to step down the voltage as well as semiconductor power switches to commutate the current. In such systems, cooling of vehicle drive components may be accomplished through the use of electrically driven cooling systems that include blowers or fans. It may be possible, however, for communication between electrical components within an electrically driven cooling system to be interrupted or severed. As will be appreciated, if communication is lost, the system controller may not be able to control the cooling system resulting in a potentially immobile vehicle.

It is therefore desirable to provide a system and method for powering accessories, such as electrical cooling system, that allows for control of the accessory, e.g., a blower, in the event of a communication failure.

BRIEF DESCRIPTION

In one embodiment, a vehicle includes a power source, a controller, a converter configured to receive a first voltage from the power source and to convert the first voltage to a second voltage, an auxiliary inverter system electrically coupled to an output of the converter and to an accessory having an electric motor, the auxiliary inverter system configured to convert the second voltage received from the converter for powering the electric motor, and a first communication link between the controller and the auxiliary inverter system. The auxiliary inverter system is further configured, responsive to interruption of the first communication link, to control a speed of the electric motor based on a level of the second voltage.

In another embodiment, a system includes a controller configured to receive information regarding an operational mode of a machine and an accessory configured to operate in a state that is commensurate with an operational mode of the machine, the accessory receiving power from a power source. The system further includes at least one communication link between the controller and accessory, the link commanding the accessory to operate in a state commensurate with an operational mode of the machine. If the at least one communication link is interrupted, the accessory can still operate at a state commensurate with an operational mode of the machine based on the power received from the power source.

In another embodiment, a system includes a controller and a converter configured to receive a first voltage from a power source and step down the first voltage to a lower, secondary voltage, the secondary voltage being indicative of an operating level of a vehicle. The system further includes at least one auxiliary inverter electrically coupled to the converter and to an accessory, the auxiliary inverter receiving the secondary voltage. The system also includes a first communication link between the controller and the auxiliary inverter and a second communication link between the controller and the converter. In operation, if one of the communication links is interrupted, the accessory will continue to operate at a level commensurate with the operational mode of the vehicle based on the secondary voltage.

In yet another embodiment, a method includes selecting a secondary voltage provided by a converter based on an operational mode of a machine, the machine including at least one accessory having an electric motor and providing the secondary voltage to an auxiliary inverter electrically coupled to the accessory. The method further includes operating the accessory at a level commensurate with the operational mode of the machine in the event that a communication link between the controller and the auxiliary inverter is interrupted or a communication link between the controller and the converter is interrupted.

DRAWINGS

The present invention will be better understood from reading the following description of non-limiting embodiments, with reference to the attached drawings, wherein below:

DETAILED DESCRIPTION

Figure 1:
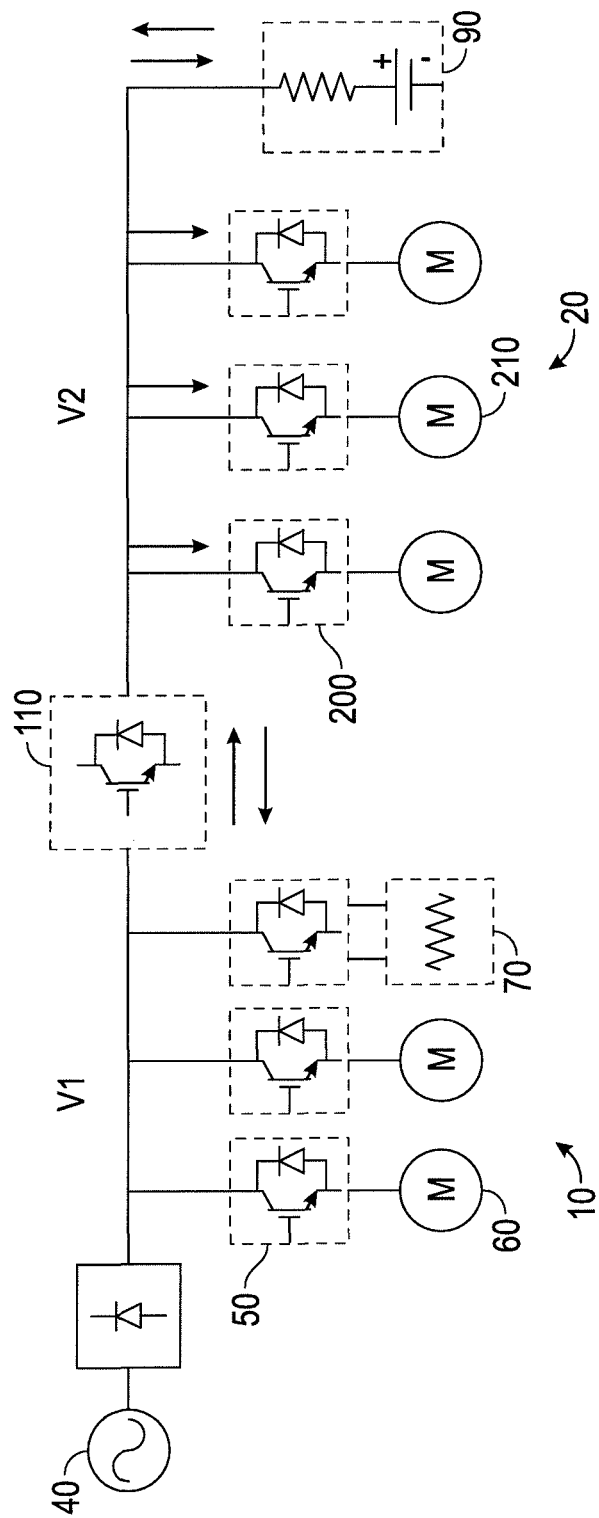
FIG. 1 is a simplified schematic diagram of a system for controlling electrically driven accessories, according to an embodiment of the present invention.

Reference will be made below in detail to exemplary embodiments of the invention, examples of which are illustrated in the accompanying drawings. Wherever possible, the same reference characters used throughout the drawings refer to the same or like parts. While embodiments of the invention are suitable for use with both mobile and stationary implementations, for ease of explanation a mobile implementation is described in detail herein. More specifically, an OHV has been selected for clarity of illustration for the disclosure of mobile embodiments.

Other suitable vehicles include on-road vehicles, off-highway vehicles, mining equipment, construction equipment, industrial equipment, and marine vessels. In addition, embodiments of the present invention are equally applicable to any type of machine, motive or non-motive, which includes auxiliary components that require cooling, such as associated power electronics.

Embodiments of the invention may also be applicable to zero-emissions vehicles, those that during their operation do not reduce the availability of breathable air in its vicinity as well as hybrid vehicles, i.e., vehicles provided both with a secondary energy storage device as well as a primary chemical energy production device, e.g., a diesel combustion engine.

Embodiments of the invention allow an accessory device to operate at a speed or level "commensurate with" an operating mode of a machine. As used herein, commensurate with refers to a condition or state that is proportional/comparable to, appropriate for, or otherwise desirable in relation to a machine operating mode.

Referring now to FIG. 1, embodiments of the inventive system are configured for use with a motive machine such as an OHV. In these embodiments, the system generally includes a primary DC link 10 and a secondary DC link 20. The links 10, 20 are electrically coupled to a converter 110, e.g., a DC/DC converter, which steps down voltage from the primary link to the secondary link. As shown, the primary link 10 is connected to a power source 40, e.g., an alternator, which powers the system. The alternator may, in turn, be operatively connected to a combustion engine such as a diesel engine. In other embodiments, the power source 40 need not be an alternator powered by a combustion engine, but may be components of a zero-emissions electric system.

The primary link 10 includes a multiple traction inverters 50 that are coupled to multiple traction motors 60 and a braking chopper 70. As will be appreciated, the primary link 10 is used to operate the machine, e.g., an OHV, in which the system is installed. For example, the primary link 10 may be used to motor, idle or brake/retard the OHV via the traction motors 60. As shown, the system further includes a secondary link 20. The secondary link 20 also includes multiple auxiliary inverters 200, which are connected to accessory devices 210, e.g., motors. In an OHV embodiment, the accessory devices 210 could include 30-50 HP motors that drive blowers, such as grid, wheel motor and control group blowers, useful for vehicle cooling. In other embodiments, accessory devices 210 can be driven by more powerful motors, e.g., 100-200 HP. The secondary link may further include an energy storage device such as a battery 90.

As mentioned, the DC/DC converter 110 steps down the voltage from the primary to the secondary links. In an embodiment, the converter 110 steps down the voltage from a variable "high-voltage" traction DC primary link to a "mid-voltage" DC secondary link for use by accessories. The variable mid-voltage link provides bus level voltage and voltage for accessory devices such as cooling blowers. As will be readily appreciated, the components within links electrically communicate via standard electrical connections, e.g., cables.

In one aspect, voltage is stepped down from a first voltage V1 (e.g., the "high-voltage") to a secondary voltage V2 (e.g., the "mid-level voltage"). The secondary voltage V2 is indicative of an operational mode of operation of the OHV. For example, V2 may be representative of a mode of vehicle operation such as idling, motoring or retarding. The power (e.g., voltage) required for each mode is different. For example, if motoring V2 would likely be higher than for idling. In other words, the higher V2 represents a vehicle mode of operation, e.g., motoring, in which a greater amount of system cooling might be required than for a lower V2 representative of, for example, an idle vehicle mode. As used herein, "operational mode" refer to operational conditions or modes of a machine, such as the vehicle modes mentioned above, for which corresponding modes of accessory operation, e.g., cooling blower speeds, are necessary or are otherwise desirable.

In an embodiment, the first voltage V1 ranges from about 500V to about 2200V and the secondary voltage V2 ranges from about 580V to about 860V. As will be appreciated, however, other first and secondary voltage levels may be employed depending on the type of machine vehicle, intended use, etc. In certain embodiments, it may also be possible to use other power indicia to represent the operational mode of the vehicle or machine.

Figure 2:
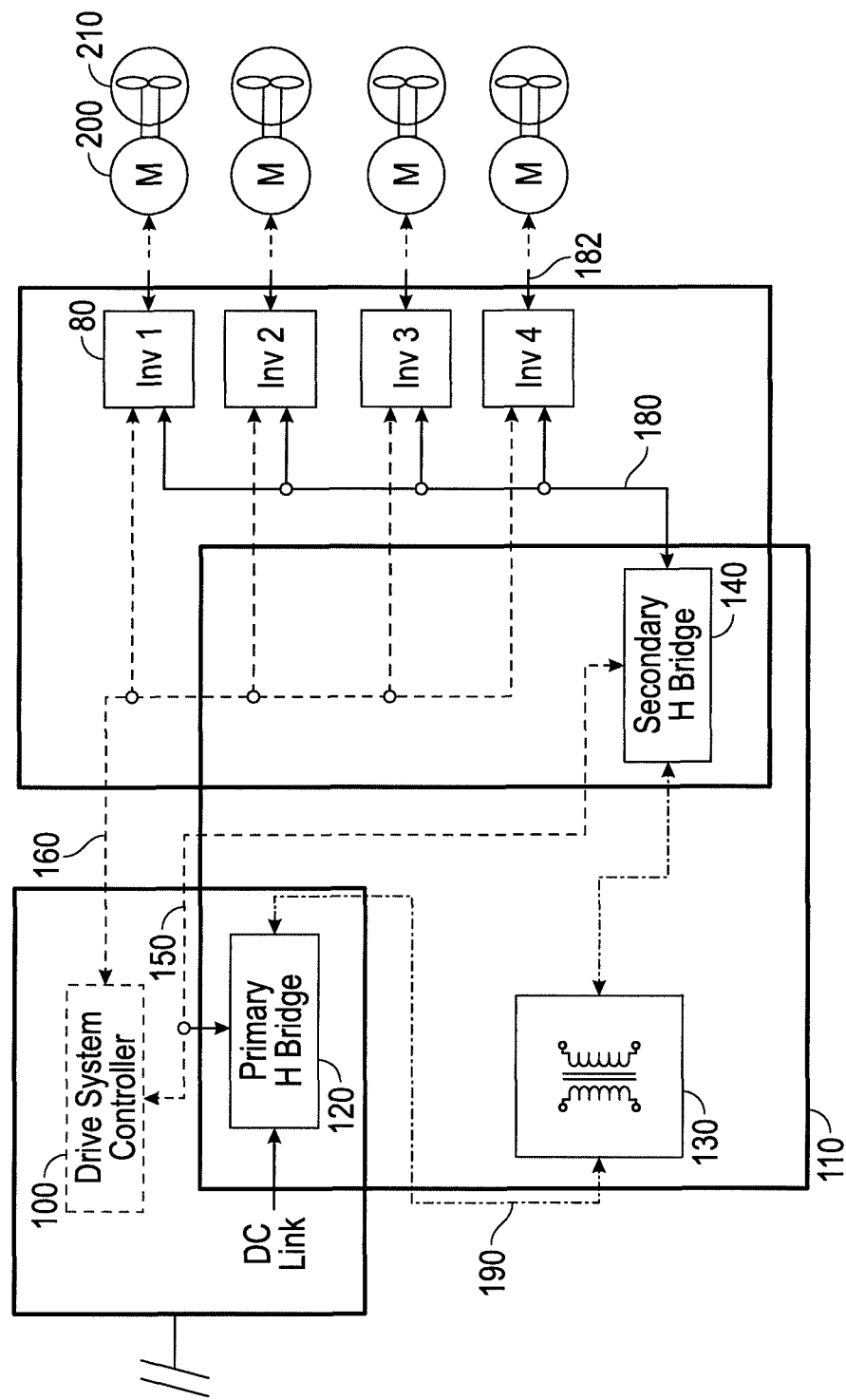
FIG. 2 is a simplified schematic diagram of a secondary link of a system according to an embodiment of the present invention.

Referring now to FIG. 2, embodiments of the system further include a controller 100 that communicates with the DC/DC converter 110 that features two H-bridges. More specifically, the converter 110 includes a primary H-bridge 120 electrically coupled to a transformer 130, which, in turn, is electrically coupled to a secondary H-bridge 140.

The controller 100 communicates with the converter 110 through a first communication link 150, and with the auxiliary inverters 80 through a second communication link 160. In an embodiment, the communication links are operatively connected to the inverters and converter via inverter and converter controllers, respectively (not shown). The controller 100 also communicates with, and controls the alternator, and, by extension, the primary link 10, though a third communication link (not shown). In embodiments, the communication links can be Ethernet or fiber optic based, though other communication protocols may be employed. Although embodiments are configured for use with systems including two/three communications links, other embodiments may be suitable for use with more than three links between a controller and system components.

As will be appreciated, in addition to communication links 150, 160, power is transferred between system components. In an embodiment, single phase AC power 190 is transferred between components (H-bridges 120, 140 and transformer 130) in the converter 110. DC power 180 is output from the secondary H-bridge to the auxiliary inverters. The auxiliary inverters 80, in turn, supply single phase AC power 182 to the motor 200 accessory devices/blowers 210.

In embodiments, system components may be physically housed in various locations in the machine, e.g., vehicle. For example, in an OHV the system controller 100 and converter components may be located in a main cabinet and the auxiliary inverters 80 may be located within a cooling blower inverter cabinet.

During normal operation, the controller 100 determines and sets the mode of accessory operation, e.g., blower speed, via the communication links. That is, the controller 100 receives input on the operation mode of the vehicle and then the controller commands the blower via the communication link to the converter 110, first communication link 150, and/or the second communication link 160 to the inverters. In certain circumstances, however, it may be possible for the first and/or second communication links between the controller 110 and the converter or inverters to be severed/interrupted, or otherwise fail, such that the links are incapable of transmitting a signal between the interconnected components.

In an embodiment of the invention, in the event of a communication link failure, the stepped down secondary voltage V2 is used as a communication medium to the cooling blowers, or other accessory device. That is, the controller 100 schedules secondary voltage V2 based on the level of accessory device operation required and the inverters for the accessory are programmed to go to specific speeds based on the secondary voltage V2. For example, if the vehicle is motoring, the secondary voltage V2 might be at its nominal operating voltage, e.g., 800V. The accessory speed for this voltage might be set so that a blower operates at its maximum speed during motoring. For an idling vehicle mode, the accessory speed for this voltage might be set so that a blower operates at a reduced speed corresponding to an idle vehicle, e.g., 500V. As will be appreciated, the number of accessory speeds/operational voltage levels may vary depending on the type of vehicle or machine, operational environment, etc.

In the event that communication link 160 to the auxiliary inverters is lost, the system controller 100 is incapable of commanding blower speed and receives no feedback on blower speed or current. Under these circumstances, the auxiliary inverters shall use the secondary voltage V2 to determine their operating point.

In the event that the first communication link 150 to the converter 110 is lost, the converter shall regulate to the secondary voltage level V2. If the second communication link 160 to the auxiliary inverters is intact, the inverters may be controlled to any level, and all feedback necessary to determine the system operating condition will be available. In an embodiment, the converter 110 will automatically shut down when it detects an input voltage below a certain threshold, indicating normal system shutdown or abnormal traction link operation.

If both communication links 150, 160 to the controller 100 are interrupted, then the system defaults to running in a high operational mode, e.g., nominal system voltage, until sufficient communication is restored. For example, in an OHV context, the system defaults to a motoring mode in which the accessory device (e.g., blowers) run at a high level, regardless of whether the vehicle is actually motoring, to prevent any potential overheating.

In an embodiment, a vehicle includes a power source, a controller, a converter configured to receive a first voltage from the power source and to convert the first voltage to a second voltage, an auxiliary inverter system electrically coupled to an output of the converter and to an accessory having an electric motor, the auxiliary inverter system configured to convert the second voltage received from the converter for powering the electric motor, and a first communication link between the controller and the auxiliary inverter system. The auxiliary inverter system is further configured, responsive to interruption of the first communication link, to control a speed of the electric motor based on a level of the second voltage. The vehicle also includes at least one traction inverter electrically coupled to the power source, at least one traction motor electrically coupled to the traction inverter and wherein the controller controls the power source as well as the auxiliary inverter. The DC/DC converter includes primary and secondary H-bridge circuits electrically connected to a transformer. In embodiments, the accessory is a blower. The system includes a plurality of auxiliary inverters and may further include an energy storage device electrically coupled to the converter. The power source is an alternator. The communication links may utilize an Ethernet protocol. The first voltage ranges from about 500V to about 2200V and secondary voltage ranges from about 580V to about 860V. The operational mode of the vehicle is either motoring, idling or retarding.

In another embodiment, a system includes a controller configured to receive information regarding an operational mode of a machine and an accessory configured to operate in a state that is commensurate with an operational mode of the machine, the accessory receiving power from a power source. The system further includes at least one communication link between the controller and accessory, the link commanding the accessory to operate in a state commensurate with an operational mode of the machine. If the at least one communication link is interrupted, the accessory can still operate at a state commensurate with an operational mode of the machine based on a level of power received from the power source. In embodiments, the machine is a vehicle and the accessory is a blower. The system further includes an energy storage device electrically coupled to the converter and the power source is an alternator. The communication links utilize an Ethernet protocol. The operational mode of the machine is motoring, idling or retarding.

In another embodiment, a system includes a controller and a converter configured to receive a first voltage from a power source and step down the first voltage to a lower, secondary voltage, the secondary voltage being indicative of an operational mode of a machine. The system further includes at least one auxiliary inverter electrically coupled to the converter and to an accessory, the auxiliary inverter receiving the secondary voltage. The system also includes a first communication link between the controller and the auxiliary inverter and a second communication link between the controller and the converter. In operation, if one of the communication links is interrupted, the accessory will continue to operate at a level commensurate with the operating level of the machine based on the secondary voltage. The system further includes at least one traction inverter electrically coupled to the power source, at least one traction motor electrically coupled to the traction inverter, and the controller controls the power source as well as the auxiliary inverter. The converter 110 is a DC/DC converter that includes first and secondary H-bridge circuits electrically connected to a transformer. In embodiments, the system includes a plurality of auxiliary inverters. The power source is an alternator. In embodiments, the first voltage ranges from about 500V to about 2200V. The secondary voltage ranges from about 580V to about 860V. In embodiments, the machine is an OHV and the mode of the OHV is either motoring, idling or retarding.

In yet another embodiment, a method includes selecting a secondary voltage provided by a converter based on an operational mode of a machine, the machine including at least one accessory having an electric motor and providing the secondary voltage to an auxiliary inverter electrically coupled to the accessory. The method further includes operating the accessory at a level commensurate with the operational mode of the machine in the event that a communication link between the controller and the auxiliary inverter is interrupted or a communication link between the controller and the converter is interrupted.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting and are exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, terms such as "first," "second," "third," "upper," "lower," "bottom," "top," etc. are used merely as labels, and are not intended to impose numerical or positional requirements on their objects. Further, the limitations of the following claims are not written in means-plus-function format and are not intended to be interpreted based on 35 U.S.C. § 122, sixth paragraph, unless and until such claim limitations expressly use the phrase "means for" followed by a statement of function void of further structure.

This written description uses examples to disclose several embodiments of the invention, including the best mode, and also to enable one of ordinary skill in the art to practice the embodiments of invention, including making and using any devices or systems and performing any incorporated methods. The patentable scope of the invention is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above power converter and method, without departing from the spirit and scope of the invention herein involved, it is intended that all of the subject matter of the above description or shown in the accompanying drawings shall be interpreted merely as examples illustrating the inventive concept herein and shall not be construed as limiting the invention.

What is claimed is:

1. A vehicle comprising:
   a power source;
   a controller configured to receive information regarding a mode of operation of the vehicle;
   a converter configured to receive a first voltage from the power source and to convert the first voltage to a second voltage;
   an accessory having an electric motor;
   an auxiliary inverter system electrically coupled to an output of the converter and to the accessory having the electric motor, the auxiliary inverter system configured to convert the second voltage received from the converter for powering the electric motor; and
   a first communication link between the controller and the auxiliary inverter system, the first communication link allowing the controller to command the auxiliary inverter system to control a speed of the electric motor in the state commensurate with the mode of operation of the vehicle;
   wherein the auxiliary inverter system is further configured, responsive to interruption of the first communication link, to control a speed of the electric motor based on a level of the second voltage received from the converter to maintain operation of the accessory.

2. The vehicle of claim 1 further comprising:
   at least one traction inverter electrically coupled to the power source;
   at least one traction motor electrically coupled to the traction inverter; and
   wherein the controller controls the power source as well as the auxiliary inverter system.

3. The vehicle of claim 1 wherein the converter is a DC/DC converter.

4. The vehicle of claim 3 wherein the DC/DC converter includes primary and secondary H-bridge circuits electrically connected to a transformer.

5. The vehicle of claim 1 wherein the accessory is a blower.

6. The vehicle of claim 1 wherein the auxiliary inverter system includes a plurality of auxiliary inverters.

7. The vehicle of claim 1 further comprising an energy storage device electrically coupled to the converter.

8. The vehicle of claim 1 wherein the power source is an alternator.

9. The vehicle of claim 1, further comprising:
   a second communication link between the controller and the converter;
   wherein the second voltage is indicative of the mode of operation of the vehicle; and
   wherein if one of the communication links is interrupted, the accessory will continue to operate at a level commensurate with the mode of operation of the vehicle based on the second voltage.

10. The vehicle of claim 9 wherein the communication links utilize an Ethernet protocol.

11. The vehicle of claim 1 wherein the first voltage ranges from about 500V to about 2200V.

12. The vehicle of claim 1 wherein the second voltage ranges from about 580V to about 860V.

13. The vehicle of claim 1 wherein the mode of operation of the vehicle is either motoring, idling or retarding.

14. A system comprising:
   a controller configured to receive information regarding an operational mode of a machine;
   an accessory configured to operate in a state that is commensurate with the operational mode of the machine, the accessory receiving power from a power source;
   at least one communication link between the controller and accessory, the link commanding the accessory to operate in a state commensurate with the operational mode of the machine; and
   wherein if the at least one communication link is interrupted, the accessory can select and operate at a state commensurate with an operational mode of the machine based on a level of power received from the power source.

15. The system of claim 14 wherein the machine is a vehicle.

16. The system of claim 14 wherein the accessory is a blower.

17. The system of claim 14 further comprising an energy storage device electrically coupled to the converter.

18. The system of claim 14 wherein the power source is an alternator.

19. The system of claim 14 wherein the operational mode of the machine is motoring, idling or retarding.

20. The system of claim 14 wherein the communication links utilize an Ethernet protocol.

21. A system comprising:
a controller;
a converter configured to receive a first voltage from a power source and step down the first voltage to a lower, secondary voltage, the secondary voltage being indicative of an operational mode of a machine;
at least one auxiliary inverter electrically coupled to the converter and to an accessory having an electric motor, the auxiliary inverter receiving the secondary voltage;
a first communication link between the controller and the auxiliary inverter;
a second communication link between the controller and the converter; and
wherein if one of the communication links is interrupted, the accessory will continue to operate at a level commensurate with the operational mode of the machine based on the secondary voltage.

22. The system of claim 21 further comprising:
at least one traction inverter electrically coupled to the power source;
at least one traction motor electrically coupled to the traction inverter; and
wherein the controller controls the power source as well as the auxiliary inverter.

23. The system of claim 21 wherein the converter is a DC/DC converter.

24. The system of claim 23 wherein the DC/DC converter includes primary and secondary H-bridge circuits electrically connected to a transformer.

25. The system of claim 21 wherein the system includes a plurality of auxiliary inverters.

26. The system of claim 21 wherein the power source is an alternator.

27. The system of claim 21 wherein the first voltage ranges from about 500V to about 2200V.

28. The system of claim 21 wherein the secondary voltage ranges from about 580V to about 860V.

29. The system of claim 21 wherein machine is an OHV and the mode of the OHV is either motoring, idling or retarding.

30. A method comprising:
selecting a secondary voltage provided by a converter based on an operational mode of a machine, the machine including at least one accessory having an electric motor;
providing the secondary voltage to an auxiliary inverter electrically coupled to the accessory; and
operating the accessory at a level commensurate with the operational mode of the machine in the event that a communication link between the controller and the auxiliary inverter is interrupted or a communication link between the controller and the converter is interrupted.

* * * * *